United States Patent Office.

EUGEN A. BAUMANN, OF FREIBURG, BADEN, ASSIGNOR TO THE FARBEN-FABRIKEN, VORMALS FRIEDR. BAYER & CO., OF ELBERFELD, GERMANY.

MEDICAL COMPOUND.

SPECIFICATION forming part of Letters Patent No. 391,875, dated October 30, 1888.

Application filed June 21, 1888. Serial No. 277,841. (Specimens.)

*To all whom it may concern:*

Be it known that I, EUGEN A. BAUMANN, professor of the University of Freiburg, doctor of philosophy, a subject of the Emperor of Germany, residing in the city of Freiburg, in Breisgau, in the Grand Duchy of Baden, Germany, have invented new and useful Improvements in the Production of a New Class of Products, of which the following is a specification.

My invention relates to the production of a new pharmaceutical product by adding oxygens to the product invented by me and called "acetonæthylmercaptol." This new product is of very great value for use as a medicine in the class of soporific drugs.

In carrying out my invention practically I proceed as follows: Ten (10) kilos of acetonæthylmercaptol, gained by condensing one part of aceton and two parts of æthylmercaptol with dry muriatic acid, as described by me, (Berichte der Deutsch Chem. Gesellschaft, Vol. XVIII, 1885, page 887,) are mixed with an aqueous solution of five per cent. of permanganate of potassium, while diluted sulphuric acid or acetic acid is slowly added to neutralize the hydroxide of potassium formed by the reaction. The oxidation is finished as soon as hypermanganate is no longer discharged after stirring. Now boil up, separate the solution of the so-formed new body from the peroxide of manganate by filtration, and evaporate off the water bath.

The new product—called by me "diæthylsulfondimethylmethan"—crystallizes in large crystals and can be purified by recrystallization. It forms large colorless prisms, difficultly soluble in cold but easily soluble in hot water or alcohol. Ether, benzole, and chloroform dissolve it very easily.

The new body, having the following composition:

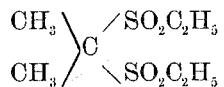

melts at 125° to 126° centigrade; boils at 300° centigrade under decomposition, the distillate having a yellow color.

What I claim as my invention, and desire to secure by Letters Patent, is—

The product herein described, which has the following characteristics: It forms large colorless prisms, is difficultly soluble in cold but easily soluble in hot water or alcohol, or in ether, benzole, and chloroform, it melts at 125° to 126° centigrade and boils at 300° under decomposition, and has a general composition of $C_7H_{16}S_2O_4$.

In testimony whereof I have signed my name in presence of two subscribing witnesses.

EUGEN A. BAUMANN.

Witnesses:
  PAUL KRASKE,
*Professor of Surgery, University of Freiburg, Germany.*
  ALFRED KAST,
*Professor of Medicine, University of Freiburg, of Breisgau, Germany.*